Patented Feb. 27, 1951

2,543,691

UNITED STATES PATENT OFFICE 2,543,691

AZO DYES AS SILVER HALIDE PHOTOGRAPHIC DEVELOPING AGENTS

Joseph S. Friedman, Binghamton, N. Y., assignor to General Aniline & Film Corporation, New York, N. Y., a corporation of Delaware No Drawing. Application June 7, 1946, Serial No. 675,307

13 Claims. (Cl. 95—88)

This invention relates to photographic developers, and more particularly to photographic developers containing an azo group.

Kendall's rule (IX$^e$ Cong. int. Phot. sc. appliq. (1935), p. 252) states that for a compound to be a developer, it is necessary that the two functional groups within the molecule be separated by a homogeneous conjugated chain containing an even number of carbon atoms. The functional groups are hydroxy, amino or substituted amino groups. No disclosure has yet been made in which the homogeneity of the conjugated chain has been questioned.

It is reported (History of Color Photography by J. S. Friedman, page 400) that the azo dye

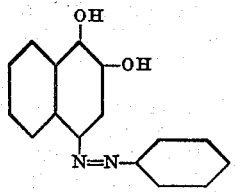

4-phenyl-azo-1:2-dioxynaphthalene has developing properties and yields a dye image simultaneously with the silver. It is to be noted, however, that in this dye the two funtcional groups are on the same nucleus, that they are separated from each other by one vinyl link, and, accordingly, there is no departure from Kendall's rule.

One of its objects is a group of new photographic developers containing an azo group.

Another object is a group of photographic developers which can be used for ordinary and primary color development.

Further objects will be seen from the following detailed specification.

I have discovered that azo dyes formed by coupling a diazotized p- or o-aminophenol or 1,2- or 1,4-aminonaphthol, possess the ability to reduce exposed silver halide grains to the metallic state. These azo dyes are characterized by the following general formula:

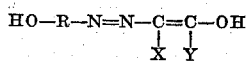

wherein R represents an aromatic radical of the benzene or napthalene series, X represents an aliphatic acyl group, e. g., acetyl, propionyl, butyryl, etc., or a carboalkoxy group, e. g., carbomethoxy, carbethoxy, carbopropoxy, etc., and Y represents an alkyl group, e. g., methyl, ethyl, propyl, butyl, amyl and the like, an aryl group, e. g., phenyl, o-, m-, and p-tolyl, naphthyl, di- phenyl, etc., or an aralkyl group, e. g., benzyl, methyl benzyl, ethyl benzyl, and the like.

The following are representative of azo substituted compounds which fall within the scope of the above class.

(1) 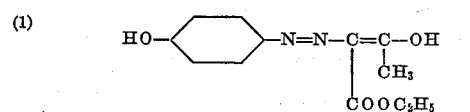

Ethyl-(p-hydroxyphenyl-azo)-acetoacetate (2) 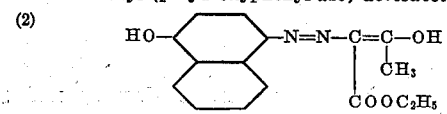

Ethyl-(p-hydroxynaphthalene-azo)-acetoacetate (3) 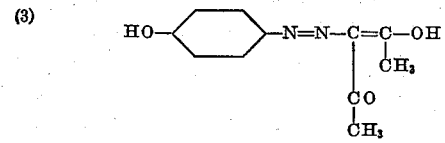

p-Hydroxyphenyl-azo-acetylacetone (4) 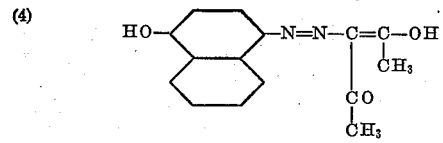

p-Hydroxynaphthalene-azo-acetylacetone (5) 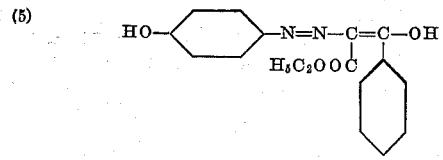

Ethyl-(p-hydroxyphenyl-azo)-benzoylacetate (6) 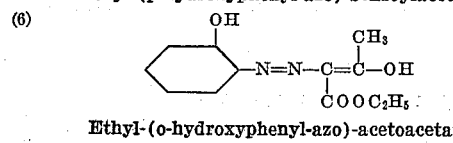

Ethyl-(o-hydroxyphenyl-azo)-acetoacetate

The above compounds are readily prepared in good yield by first diazotizing any o- or p-aminophenol, 1,2- or 1,4-aminonaphthol, in which the amino group is always in o- or p-position to the hydroxy group, and then coupling the diazotized product with a coupling agent such as acetylacetone, benzoylacetone, naphthoylacetone acylacetic ester, e. g., acetoacetic ester, propionylacetic ester, butanoyl acetic ester, etc., arylacetic ester, e. g., benzoylacetic ester, naphthoylacetic ester, toluylacetic ester, and the like, heterocyclicacetic ester, e. g., furoylacetic ester, coumarilylacetic ester, etc., by methods well known to the art which need not be described herein.

It should be noted that the above compounds differ structurally from the azo dye developer of the prior art in that they contain two functional hydroxyl groups which are not attached to the same nucleus, nor are they connected in any manner by a homogeneous conjugated chain. It was, therefore, wholly surprising and unexpected to find that the above compounds possessed developing properties, inasmuch as they depart very materially from Kendall's rule.

The dyes, as exemplified by illustrations 1 to 6, are not substantive to gelatin and consequently can be removed from the film by extended washing or by the use of water-alcohol, water-dioxane, water-acetone, etc., solvent mixtures.

The azo acyl esters, as exemplified by illustrations 1, 2 and 6, form an especially useful type of developing agent. The simpler elements of this group are not substantive to gelatin, hence yield images in which the whites are not stained. In situ with the silver image there is formed also a dye image that can be isolated by the removal of the silver. The dye so formed is rather tenaciously retained by the gelatin even though the developing agent from which it is produced is not substantive to gelatin. It can readily be reduced to the leuco form, but even though complete transparency and freedom from color results, further treatment of the leuco compound with an oxidizing agent restores the dye image to practically its original intensity. This enables the operator considerable latitude in processing while ensuring that he obtain interesting and useful results.

Another very important property of these azo developers is that during development of exposed silver-halide grains they deposit colored products which are retained by the film more tenaciously than the azo dye itself. Hence, it is possible to effect a primary color development by this means, of a character that is different from that previously known.

Primary color development is defined as a development in which the oxidation product of the developing agent is a highly colored insoluble or gelatin substantive body. In this respect it differs from secondary color development in which the oxidation products condense with other agents to form the dye or color images.

A still further important and useful property of these azo developers is their stability to air. It is possible, if so desired, to eliminate completely the sulfite without unduly impairing the keeping qualities of the developer solutions.

The following are examples of developing solutions prepared in accordance with the present invention:

Example I

| | | |
|---|---|---|
| p-Hydroxyphenyl-azo-acetylacetone | grams | 1 |
| Sodium sulfite | do | 5 |
| Sodium hydroxide | do | 1 |
| Water to make | cc | 100 |

An exposed black and white film was developed in the developer as above prepared for ten minutes. After development, the film was washed, fixed, and washed again in the normal manner.

If the developing agent is obtained in the form of its soluble sodium salt, the sodium hydroxide in the above formula can be replaced by sodium carbonate to a photographically equivalent quantity. In the event the development is too vigorous and results in the formation of appreciable quantities of metallic silver fog, some restrainer, such as potassium bromide, can be added.

Example II

| | | |
|---|---|---|
| Ethyl-(p-hydroxyphenyl-azo)-acetoacetate | grams | 1 |
| Sodium sulfite | do | 5 |
| Sodium carbonate | do | 5 |
| Water to make | cc | 100 |

A film which was exposed through a blue filter separation negative was developed in the developer as above prepared for ten minutes. After development, the film was washed for thirty minutes. The silver formed in the development was then converted to an insoluble silver salt by treatment with a bleaching bath of the following formula:

| | | |
|---|---|---|
| Potassium ferricyanide | grams | 4 |
| Sodium chloride | do | 10 |
| Water to make | cc | 100 |

After this treatment, the excess of bleach solution was removed by washing and the film fixed in hypo, washed and dried. A brilliant lemon yellow positive image suitable for use as the minus blue component of a three color reproduction, was obtained.

This yellow image has approximately the same hue as the azo developing agent, but it is very substantive to gelatin, hence cannot be the same material. It is readily reduced to a colorless product by treatment with strong reducing agents. The colorless product is most probably the leuco derivative of the dye since treatment with ferricyanide bleach regenerates the yellow image in almost its original intensity. The property of the dye image formed in this manner enables the use of light restraining or filter dyes within the emulsion, that cannot be destroyed except by hydrosulfite bleach baths. Treatment of such a dyed emulsion with hydrosulfite does not reduce the dye image to a leuco dye, but leaves it attached to the film in its proper place. Simultaneously, the filter or light restraining dye can be completely destroyed, so that it will no longer regenerate upon treatment with the ferricyanide bleach. Thus, upon such treatment, only the dye image will become regenerated.

Example III

Example II was repeated with the exception that 1 gram of ethyl-(p-hydroxynaphthalene-azo)-acetoacetate was substituted for 1 gram of ethyl-(p-hydroxyphenyl-azo)-acetoacetate.

It is to be observed that the present invention is a surprising and unexpected discovery which could not have been predicted by those skilled in the art. This is particularly true because the two functional groups of these developers are separated by a heterogeneous conjugated chain, and hence their adaptability as developers was negatived by Kendall's rule.

While there have been pointed out above certain preferred embodiments of the invention, the same is not limited to the specific details, illustrations, or to the examples given herein, but is capable of manifold variations and modifications. Accordingly, therefore, it is intended that the invention be defined only by the accompanying claims, in which it is intended to include all features of patentable novelty residing therein.

I claim:

1. A process of developing images in an exposed silver halide photographic emulsion, which comprises subjecting said emulsion to the action of a developing solution containing as a silver halide developer p-hydroxyphenyl-azo-acetylacetone for a time sufficient to yield a metallic silver image and a dyestuff image in situ with the silver image and removing the metallic silver by bleaching.

2. A process of developing images in an exposed silver halide photographic emulsion, which comprises subjecting said emulsion to the action of a developing solution containing as a silver halide developer ethyl-(p-hydroxyphenyl-azo)-acetoacetate for a time sufficient to yield a metallic silver image and a dyestuff image in situ with the silver image and removing the metallic silver by bleaching.

3. A process of developing images in an exposed silver halide photographic emulsion, which comprises subjecting said emulsion to the action of a developing solution containing as a silver halide developer ethyl-(p-hydroxynaphthalene-azo)-acetoacetate for a time sufficient to yield a metallic silver image and a dyestuff image in situ with the silver image and removing the metallic silver by bleaching.

4. A process of developing images on an exposed silver halide photographic emulsion, which comprises subjecting said emulsion to the action of a developing solution containing as the silver halide developer an azo dye having the general formula:

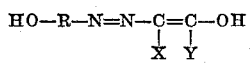

wherein R represents an aromatic radical selected from the class consisting of the benzene and naphthalene series, X represents a member selected from the class consisting of acyl and carbalkoxy groups, and Y represents a member selected from the class consisting of alkyl, aryl and aralkyl groups for a time sufficient to yield a metallic silver image and a dyestuff image in situ with the silver image and removing the metallic silver by bleaching.

5. The process of producing negative dyestuff images in an exposed silver halide photographic emulsion, which comprises subjecting said emulsion to the action of a developing solution containing as the silver halide developer an azo dye having the following formula:

$$HO-R-N=N-C=C-OH$$
$$\phantom{HO-R-N=N-}|\phantom{=}|$$
$$\phantom{HO-R-N=N-}X\phantom{=}Y$$

wherein R represents an aromatic radical selected from the class consisting of the benzene and naphthalene series, X represents a member selected from the class consisting of acyl and carbalkoxy groups and Y represents a member selected from the class consisting of alkyl, aryl and aralkyl groups for a time sufficient to yield a metallic silver image and a dyestuff image in situ with the silver image, and removing the metallic silver image by bleaching.

6. The process of producing negative dyestuff images in an exposed silver halide photographic emulsion which comprises subjecting said emulsion to the action of a developing solution containing as the silver halide developer p-hydroxyphenyl-azo-acetylacetone for a time sufficient to yield a metallic silver image and a dyestuff image in situ with the silver image and removing the metallic silver by bleaching.

7. The process of producing negative dyestuff images in an exposed silver halide photographic emulsion which comprises subjecting said emulsion to the action of a developing solution containing as the silver halide developer ethyl-(p-hydroxyphenyl-azo)-acetoacetate for a time sufficient to yield a metallic silver image and a dyestuff image in situ with the silver image and removing the metallic silver by bleaching.

8. The process of producing negative dyestuff images in an exposed silver halide photographic emulsion which comprises subjecting said emulsion to the action of a developing solution containing as the silver halide developer ethyl-(p-hydroxynaphthalene-azo)-acetoacetate for a time sufficient to yield a metallic silver image and a dyestuff image in situ with the silver image and removing the metallic silver by bleaching.

9. A process of producing dyestuff images in an exposed silver halide photographic emulsion which comprises subjecting said emulsion to the action of a developing solution containing as the silver halide developer an azo dye having the following general formula:

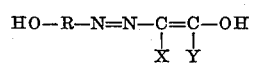

wherein R represents an aromatic radical selected from the class consisting of the benzene and naphthalene series, X represents a member selected from the class consisting of acyl and carbalkoxy groups, and Y represents a member selected from the class consisting of alkyl, aryl and aralkyl groups to yield a silver and dye image in situ therewith, converting the dyestuff image into its leuco form and subjecting the silver image to the action of an oxidizing agent which reforms the said dyestuff image in situ with the silver image and bleaching the silver image to yield a pure dyestuff image.

10. A process of producing dyestuff images in an exposed silver halide photographic emulsion which comprises subjecting said emulsion to the action of a developing solution containing as the silver halide developer p-hydroxyphenyl-azo-acetylacetone to yield a silver and dye image in situ therewith, converting the dyestuff image into its leuco form, and subjecting the silver image to the action of an oxidizing agent which reforms the said dyestuff image in situ with the silver image and bleaching the silver image to yield a pure dyestuff image.

11. A process of producing dyestuff images in an exposed silver halide photographic emulsion which comprises subjecting said emulsion to the action of a developing solution containing as the silver halide developer ethyl-(p-hydroxyphenyl-azo)-acetoacetate to yield a silver and dye image in situ therewith, converting the dyestuff image into its leuco form, and subjecting the silver image to the action of an oxidizing agent which reforms the said dyestuff image in situ with the silver image and bleaching the silver image to yield a pure dyestuff image.

12. A process of producing dyestuff images in an exposed silver halide photographic emulsion which comprises subjecting said emulsion to the action of a developing solution containing as the silver halide developer ethyl-(p-hydroxynaphthalene-azo)-acetoacetate to yield a silver and dye image in situ therewith, converting the dyestuff image into its leuco form, and subjecting the silver image to the action of an oxidizing agent which reforms the said dyestuff image in situ with the silver image and bleaching the silver image to yield a pure dyestuff image.

13. A process of developing an exposed silver halide photographic emulsion, which comprises subjecting said emulsion to the action of a developing solution containing as the silver halide developer an azo dye having the general formula:

$$\text{HO-R-N=N-C=C-OH}$$
$$\phantom{\text{HO-R-N=N-}}|\phantom{=}|$$
$$\phantom{\text{HO-R-N=N-}}\text{X}\phantom{=}\text{Y}$$

wherein R represents an aromatic radical selected from the class consisting of those of the benzene and naphthalene series, X represents a member selected from the class consisting of acyl and carbalkoxy groups, and Y represents a member selected from the class consisting of alkyl, aryl, and aralkyl groups for a time sufficient to yield a metallic silver image.

JOSEPH S. FRIEDMAN.

REFERENCES CITED

The following references are of record in the file of this patent:

UNITED STATES PATENTS

| Number | Name | Date |
|---|---|---|
| 2,020,775 | Gaspar | Nov. 12, 1935 |
| 2,090,484 | Ostromislensky | Aug. 17, 1937 |
| 2,193,015 | Weissberger | Mar. 12, 1940 |
| 2,339,213 | Woodward | Jan. 11, 1944 |
| 2,453,661 | Glass et al. | Nov. 9, 1948 |

OTHER REFERENCES

Friedman: "History of Color Photography," published, 1944, by The American Photographic Publishing Co., Boston; page 400 particularly cited.